United States Patent Office 2,964,492
Patented Dec. 13, 1960

2,964,492

COATING COMPOSITION CONTAINING EPOXY RESIN AND COPOLYMER OF RING-ALKYLATED STYRENE

James David Murdock and Gordon Hart Segall, Montee des Trente, Quebec, Canada, assignors to Canadian Industries Limited, Montreal, Quebec, Canada, a corporation of Canada No Drawing. Filed Apr. 30, 1958, Ser. No. 731,852

Claims priority, application Canada May 1, 1957

5 Claims. (Cl. 260—45.5)

This invention relates to new coating compositions. More particularly, it relates to new coating compositions based on copolymers of alkylated styrenes, acrylic acids and alkyl esters of acrylic acids.

In Canadian Patent No. 534,261, dated December 11, 1956, in the names of G. H. Segall and J. L. Cameron, there are described and claimed coating compositions adapted for being hardened into infusible and solvent-insoluble films on baking at a temperature of from 100° to 150° C., the said coating compositions comprising essentially a linear thermoplastic copolymer of from 15 to 80 parts of styrene and from 15 to 80 parts of an alkyl ester of acrylic acid and from 5 to 10 parts of an acrylic acid, the total parts being 100, in admixture with from 15% to 55%, by weight of said copolymer, of a low molecular weight polymeric condensation product of diphenylolpropane with epichlorohydrin, said condensation product having an epoxide content of at least 7.5% by weight and a melting point not exceeding 75° C., and a Gardner viscosity not exceeding 1.65 poises as a 40% solution in ethylene glycol monobutyl ether, and from 0.5 to 2.0% by weight of said copolymer and condensation product jointly, of a quaternary ammonium hydroxide having at least one alkyl group of from 12 to 18 carbon atoms attached to its nitrogen atom.

Despite their many useful properties, those of the aforesaid coating compositions which contain a copolymer of methyl or ethyl acrylate and styrene and which have more than 50% by weight of styrene, are still objectionable in that they are susceptible to "cratering" in the presence of contaminants such as alkyd spray dust, which renders them undesirable for use in such locations as electrical appliance finishing shops where a large quantity of coating compositions based on alkyd resins is generally used for finishing purposes.

It has now been found that if in the aforesaid objectionable coating compositions the styrene of the copolymer is replaced by an alkylated styrene, compositions are obtained which not only possess all the desirable properties of the compositions containing a styrene copolymer but also, and unexpectedly, withstand "cratering" in the presence of alkyd spray particles.

It has, moreover, been found that in these aforesaid objectionable coating compositions, the lower alkyl esters of acrylic acid of the copolymers may be replaced wholly or in part by the equivalent esters of methacrylic acid, provided always that the styrene portion of the copolymer has been replaced by an alkylated styrene.

It is therefore an object of this invention to provide new coating compositions.

Another object of this invention is to provide new coating compositions based on copolymers of alkylated styrenes, acrylic or methacrylic acids and alkyl esters of acrylic or methacrylic acids.

A further object of this invention is to provide coating compositions as hereinbefore defined which are unexpectedly superior to analogous prior art compositions from the standpoint of resistance to "cratering" in the presence of contaminants.

Additional objects of the invention will become apparent hereinafter.

The new coating compositions of the invention comprise essentially a linear thermoplastic copolymer of more than 50 parts of an alkylated styrene and at least 15 parts of methyl or ethyl acrylate or methacrylate and from 2 to 14 parts of acrylic or methacrylic acid, the total parts being 100, in admixture with from 15% to 55%, by weight of the copolymer, of a low molecular weight polymeric condensation product of diphenylolpropane with epichlorohydrin, said condensation product having an epoxide content of at least 7.5% by weight and a melting point not exceeding 75° C., and a Gardner viscosity not exceeding 1.65 poises as a 40% solution in ethylene glycol monobutyl ether, and from 0.5% to 5.0% by weight of said copolymer and condensation product jointly, of a catalyst selected from the group consisting of amines and quaternary ammonium hydroxides having at least one alkyl group of from 12 to 18 carbon atoms attached to the nitrogen atom. These coating compositions are resistant to "cratering" in the presence of contaminants and yield, upon baking at a temperature of from 100° to 150° C., protective coating films equal in quality to those obtained from analogous prior art compositions in the absence of contaminants.

The details and manner of practising this invention will be apparent by reference to the following specific examples wherein the parts given are by weight, it being understood that these examples are merely illustrative embodiments of the invention and that the scope of the invention is not limited thereto.

*Example I*

To 100 parts of a solution containing 26 parts of a copolymer of 72 parts of vinyl toluene, 20 parts of ethyl acrylate and 8 parts of acrylic acid, 33 parts of titanium dioxide pigment and 41 parts of a mixture of butanol, xylene and toluene, there were added 39 parts of a solution containing 17.6 parts of butyl acetate, 12.4 parts of ethyl acetate, 1.2 parts of octadecyl trimethyl ammonium hydroxide and 7.8 parts of a polymeric diphenylolpropane/epichlorohydrin condensation product, said condensation product having an epoxide content of 7.5–8.5% by weight and a melting point of 65–75° C., and a Gardner viscosity of 0.85–1.65 poises as a 40% solution in ethylene glycol monobutyl ether. The total non-volatile material of the resultant solution was then adjusted to 44% by the addition of xylene.

This solution was then sprayed on three steel panels, the first of which had previously received a short spray of alkyd enamel. The first two panels were then removed and the third one, while still wet, received a short spray of alkyd enamel. All three panels were subsequently baked for 30 minutes at 150° C. after which time it was found that none of the baked films displayed any "cratering." All films were, of course, infusible and solvent-insoluble.

The results recorded above were not materially changed with a similarly constituted solution containing, however, a copolymer in which the 20 parts of ethyl acrylate had been replaced by 20 parts of methyl methacrylate or 20 parts of ethyl methacrylate.

A similar experiment conducted with a 72% styrene/20% ethyl acrylate/8% acrylic acid copolymer resulted in "cratering" of the first and third panels, thus illustrating the efficiency of the vinyl toluene in the copolymer in preventing "cratering" of the paint film.

Example II

To 100 parts of a solution containing 25 parts of a copolymer of 61 parts of vinyl toluene, 29.4 parts of ethyl acrylate and 9.6 parts of methacrylic acid, 32 parts of titanium dioxide pigment and 43 parts of a mixture of butanol and xylene, there were added 37 parts of a solution containing 15.2 parts of butyl acetate, 10.7 parts of ethyl acetate, 2.6 parts of an aliphatic-aromatic hydrocarbon mixture sold by Standard of New Jersey under the name "Solvesso-150," and the properties of which are described in United States Patent No. 2,736,717 to C. Frazier, dated February 28, 1956, 1.1 parts of octadecyl trimethyl ammonium hydroxide and 7.4 parts of the polymeric diphenylolpropane-epichlorohydrin condensation product described in Example I. The total non-volatile material of the resultant solution was then adjusted to 44% by the addition of further aliphatic-aromatic solvent.

A steel panel was then sprayed with the solution, and, while still wet, shortly sprayed with alkyd enamel. After baking the panel for 30 minutes at 150° C., there was no evidence of "cratering" of the infusible and solvent-insoluble protective coating film.

Example III 100 parts of a solution containing 18 parts of a copolymer of 72 parts of p-isopropyl styrene, 20 parts ethyl acrylate and 8 parts of acrylic acid, 40 parts of titanium dioxide pigment and 42 parts of a mixture of xylene, toluene and butanol, were mixed with 17 parts of a solution containing 3 parts of octadecyl trimethyl ammonium hydroxide, 7 parts of the polymeric diphenylolpropane/epichlorohydrin condensation product described in Example I and 7 parts of butyl acetate-ethyl acetate solvent, and the resultant solution was diluted to 47% total solids by further addition of xylene.

A steel panel sprayed with the solution, over-sprayed with alkyd enamel and baked at 150° C. for 30 minutes showed no "cratering" of the insoluble and infusible protective coating film.

Example IV

Results comparable to those obtained in the previous examples were obtained by carrying out similar experiments using copolymers of the following compositions:

|     | Vinyl Toluene, percent | Methyl Methacrylate, percent | Ethyl Acrylate, percent | Acrylic Acid, percent | Methacrylic Acid, percent |
|-----|------|------|------|----|----|
| (a) | 67.3 |      | 18.7 | 14 |    |
| (b) | 68.0 | 19.0 |      |    | 13 |
| (c) | 68.0 |      | 19.0 |    | 13 |
| (d) | 68.8 |      | 19.2 | 12 |    |
| (e) | 70.4 |      | 19.6 | 10 |    |
| (f) | 73.5 |      | 20.5 | 6  |    |
| (g) | 75.0 |      | 21.0 | 4  |    |
| (h) | 76.5 |      | 21.5 | 2  |    |

Example V

Lack of "cratering" of baked films was also observed by conducting experiments similar to those of the previous examples but using the following baking catalysts instead of octadecyl trimethyl ammonium hydroxide:

(a) A tertiary amine having one methyl group and two long chain hydrocarbon groups from coconut fatty acids.

(b) A tertiary amine having one methyl group and two long chain hydrocarbon groups from soya fatty acids.

(c) A tertiary amine having one methyl group and two long chain hydrocarbon groups from hydrogenated tallow fatty acids.

(d) A tertiary amine having two methyl groups and one long chain hydrocarbon group from coconut fatty acid.

(e) A tertiary amine having two methyl groups and one long chain hydrocarbon group from palmitic fatty acid.

(f) A tertiary amine having two methyl groups and one long chain hydrocarbon group from hydrogenated tallow fatty acids.

(g) A tertiary amine having two methyl groups and one long chain hydrocarbon group from stearic fatty acid.

(h) A secondary amine having two groups derived from coconut fatty acids.

(i) A primary amine derived from soya fatty acids.

(j) A diamine, one amino group being primary the other secondary, the alkyl group of the secondary amino group being derived from soya fatty acids.

(k) A primary amine derived from tallow fatty acids.

The above-detailed examples illustrate certain embodiments of the invention wherein there are prepared and baked after application coating compositions containing specific alkylated styrene/methyl or ethyl acrylate or methacrylate/acrylic or methacrylic acid polymers of a specific composition as well as specific catalytic tertiary amines and quaternary ammonium bases. The present invention, however, is not restricted to such specific ingredients.

For example, the tertiary amines and quaternary ammonium hydroxides include all such amines and hydroxides having at least one alkyl group of from 12 to 18 carbon atoms attached to the nitrogen atom, e.g., octadecyl, hexadecyl, tetradecyl, dodecyl groups, etc. They may be present in the coating compositions in amounts ranging from 0.5 to 5% by weight of the copolymer and condensation product jointly.

For the preparation of the copolymers, any of the well-known processes for the copolymerization of styrene can be used.

In the foregoing examples, titanium dioxide is used as the pigment constituent of the coating compositions. Other pigments may also be used either alone or in admixture to produce enamels of various colours. These enamels are, however, of particular value when produced with white pigments since they are highly resistant to yellowing on baking.

The embodiments of the invention in which an exclusive property or privilege is claimed are defined as follows:

1. A coating composition which comprises essentially a linear thermoplastic copolymer of more than 50 parts of a ring-alkylated styrene and at least 15 parts of a member selected from the group consisting of methyl and ethyl acrylates and methyl and ethyl methacrylates, and from 2 to 14 parts of a member selected from the group consisting of acrylic and methacrylic acid, the total parts being 100, in admixture with from 15% to 55%, by weight of the copolymer, of a low molecular weight polymeric condensation product of diphenylolpropane with epichlorohydrin, said condensation product having an epoxide content of at least 7.5% by weight and a melting point not exceeding 75° C., and a Gardner viscosity not exceeding 1.65 poises as a 40% solution in ethylene glycol monobutyl ether, and from 0.5% to 5.0% by weight of said polymer and condensation product jointly, of a catalyst selected from the group consisting of amines and quaternary ammonium hydroxides having at least one alkyl group of from 12 to 18 carbon atoms attached to the nitrogen atom.

2. A coating composition as claimed in claim 1 wherein the linear thermoplastic copolymer is a copolymer of 72 parts of vinyl toluene, 20 parts of ethyl acrylate and 8 parts of acrylic acid.

3. A coating composition as claimed in claim 1 wherein the linear thermoplastic copolymer is a copolymer of 61 parts of vinyl toluene, 29.6 parts of ethyl acrylate and 9.4 parts of methacrylic acid.

4. A coating composition as claimed in claim 1 wherein the linear thermoplastic copolymer is a copolymer of 72 parts of p-isopropyl styrene, 20 parts of ethyl acrylate and 8 parts of acrylic acid.

5. A coating composition as claimed in claim 1 wherein the ring-alkylated styrene is selected from the group consisting of vinyl toluene and p-isopropyl styrene.

References Cited in the file of this patent

UNITED STATES PATENTS

| | | |
|---|---|---|
| 2,736,717 | Frazier | Feb. 28, 1956 |
| 2,767,153 | Sutton | Oct. 16, 1956 |
| 2,772,166 | Fowler | Nov. 27, 1956 |
| 2,798,861 | Segall et al. | July 9, 1957 |
| 2,916,469 | Lal | Dec. 8, 1959 |

FOREIGN PATENTS

| 534,261 | Canada | Dec. 11, 1956 |